(12) United States Patent
Pich et al.

(10) Patent No.: US 8,499,284 B2
(45) Date of Patent: Jul. 30, 2013

(54) VISUALIZING RELATIONSHIPS AMONG COMPONENTS USING GROUPING INFORMATION

(75) Inventors: Christian Pich, Constance (DE); Lev B. Nachmanson, Redmond, WA (US); George G. Robertson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1331 days.

(21) Appl. No.: 12/208,360

(22) Filed: Sep. 11, 2008

(65) Prior Publication Data

US 2010/0063785 A1    Mar. 11, 2010

(51) Int. Cl.
G06F 9/44    (2006.01)

(52) U.S. Cl.
USPC ............................ 717/120; 717/107; 717/113

(58) Field of Classification Search
None
See application file for complete search history.

(56) References Cited

U.S. PATENT DOCUMENTS

| | | | | |
|---|---|---|---|---|
| 5,808,625 | A * | 9/1998 | Picott et al. | 345/440 |
| 5,929,864 | A * | 7/1999 | Picott et al. | 345/440 |
| 6,041,331 | A | 3/2000 | Weiner et al. | |
| 6,282,697 | B1 * | 8/2001 | Fables et al. | 717/107 |
| 6,453,246 | B1 | 9/2002 | Agrafiotis et al. | |
| 6,519,599 | B1 * | 2/2003 | Chickering et al. | 1/1 |
| 6,928,436 | B2 | 8/2005 | Baudel | |
| 7,174,536 | B1 | 2/2007 | Kothari et al. | |
| 7,216,123 | B2 | 5/2007 | Kamvar et al. | |
| 7,676,294 | B2 * | 3/2010 | Baier et al. | 717/113 |
| 7,685,159 | B2 * | 3/2010 | Mitchell et al. | 717/120 |
| 7,853,599 | B2 * | 12/2010 | Liu et al. | 707/748 |
| 7,877,731 | B2 * | 1/2011 | Bekelman | 717/113 |
| 8,065,658 | B1 * | 11/2011 | Bali et al. | 717/113 |
| 8,381,180 | B2 * | 2/2013 | Rostoker | 717/120 |
| 2003/0061600 | A1 * | 3/2003 | Bates et al. | 717/113 |
| 2003/0200350 | A1 * | 10/2003 | Kumar et al. | 709/315 |
| 2004/0103389 | A1 * | 5/2004 | Song et al. | 717/107 |
| 2004/0268302 | A1 * | 12/2004 | Srivastava et al. | 717/120 |
| 2004/0268308 | A1 * | 12/2004 | Srivastava et al. | 717/120 |
| 2005/0038533 | A1 | 2/2005 | Farrell et al. | |
| 2007/0162903 | A1 * | 7/2007 | Babb et al. | 717/154 |
| 2008/0133496 | A1 * | 6/2008 | Kanungo et al. | 707/5 |
| 2008/0250357 | A1 * | 10/2008 | Lee et al. | 715/853 |
| 2008/0291203 | A1 * | 11/2008 | Nachmanson et al. | 345/440 |
| 2009/0187555 | A1 * | 7/2009 | Liu et al. | 707/5 |

(Continued)

OTHER PUBLICATIONS

Chen et al., "Local Multidimensional Scaling for Nonlinear Dimension Reduction, Graph Layout and Proximity Analysis", Jul. 26, 2006, University of Pennsylvania, pp. 1-68; <http://citeseerx.ist.psu.edu/viewdoc/summary?doi=10.1.1.109.1270>.*

(Continued)

*Primary Examiner* — Thuy Dao
*Assistant Examiner* — Ben C Wang

(57) ABSTRACT

A graph processing module is described for visualizing relationships among components, such as software components within a software system. The graph processing module generates group results based on grouping information which identifies groups of individual components. The graph processing module uses the group results to bias component-level analysis that it performs on the components. In one case, the component-level analysis can involve similarity analysis (e.g., using multidimensional scaling) to assess the similarity among components and importance analysis (e.g., using a network page ranking algorithm) to assess the relative importance of the components. The results of the component-level analysis can be presented for visualization. The biasing effects of the grouping results provide insight into the relationships among the components.

18 Claims, 9 Drawing Sheets

U.S. PATENT DOCUMENTS

| | | | |
|---|---|---|---|
| 2010/0060643 A1* | 3/2010 | Kolipaka et al. | 345/440 |
| 2010/0079462 A1* | 4/2010 | Breeds et al. | 345/440 |
| 2010/0289801 A1* | 11/2010 | Nachmanson | 345/440 |
| 2010/0309206 A1* | 12/2010 | Xie et al. | 345/440 |
| 2011/0173189 A1* | 7/2011 | Singh et al. | 707/722 |
| 2011/0249002 A1* | 10/2011 | Duplessis et al. | 345/440 |
| 2011/0252034 A1* | 10/2011 | Padovitz et al. | 707/737 |
| 2011/0270851 A1* | 11/2011 | Mishina et al. | 707/749 |
| 2011/0283205 A1* | 11/2011 | Nie et al. | 715/763 |
| 2012/0076414 A1* | 3/2012 | Xu et al. | 382/176 |
| 2012/0137240 A1* | 5/2012 | Krueger | 715/771 |
| 2012/0143869 A1* | 6/2012 | Padovitz et al. | 707/737 |
| 2012/0284691 A1* | 11/2012 | Aljammaz et al. | 717/120 |

OTHER PUBLICATIONS

Chen et al., "Local Multidimensional Scaling for Nonlinear Dimension Reduction, Graph Layout and Proximity Analysis", May 29, 2008, Yale University and University of Pennsylvania, pp. 1-35; <http://www.stat.yale.edu/~lc436/papers/lmds-paper1.pdf>.*

Buja et al., "Data Visualization with Multidimensional Scaling", Sep. 18, 2007, pp. 1-30; <www-stat.wharton.upeenn.edu/~buja/>.*

Buja et al., "Visualization Methodology for Multidimensional Scaling", 2003 EBSCO Publishing; <http://www-stat.wharton.upenn.edu/~buja/PAPERS/Buja-Swayne-J-Classification-Viz-MDS.pdf>.*

Pich et al., "Visual Analysis of Importance and Grouping in Software Dependency Graphs", 2008 ACM, SOFTVIS 2008, Herrsching am Ammersse, Germany, Sep. 16-17, 2008, pp. 29-32; <http://dl.acm.org/citation.cfm?doid=1409720.1409725>.*

Danny Holten, "Hierarchical Edge Bundles: Visualization of Adjacency Relations in Hierarchical Data", 2006 IEEE, IEEE Transactions on Visualization ad Computer Graphics, vol. 12, No. 5, Sep./Oct. 20065; pp. 1-8; <http://ieeexplore.ieee.org/stamp/stamp.jsp?tp=&arnumber=4015425>.*

Khan et al., "Visualization and Evolution of Software Architectures", IRTG 1131—Visualization of Large and Unstructured Data Sets Workshop 2011; pp. 25-42; <http://drops.dagstuhl.de/opus/volltexte/2012/3739/pdf/4.pdf>.*

Harel, et al., "Graph Drawing by High-Dimensional Embedding," Journal of Graph Algorithms and Applications, vol. 8, No. 2, 2004, pp. 195-214.

Schafer, et al., "Towards More Flexibility in Software Visualization Tools," Proceedings of the 3rd IEEE International Workshop on Visualizing Software for Understanding and Analysis, 2005, accessible at <<http://www.st.informatik.tu-darmstadt.de/database/publications/data/FlexibleSoftwareVisualization.pdf?id=136>>, 6 pages.

Adrian Kuhn, "RBCrawler—A Visual Navigation System for Smalltalk's Refactoring Browser," European Smalltalk User Group Innovation Technology Award, Aug. 2007, accessible at <<http://vst.ensm-douai.fr/Esug2007Media/uploads/1/rBCrawler-EsugAwards200707.pdf>>, 3 pages.

"Walrus—Graph Visualization Tool," accessible at <<http://www.caida.org/tools/visualization/walrus/>>, accessed on Jul. 9, 2008, 6 pages.

"13th Graph Drawing Contest," Information regarding 14th International Symposium on Graph Drawing, Sep. 18-20, 2006, Karlsruhe, Germany, accessible at <<http://gd2006.org/contest/details.php>>, 5 pages.

Muller, et al., "A Reverse-Engineering Approach to Subsystem Structure Identification," reprinted from Software Maintenance: Research and Practice, 5(4), 1993, pp. 181-204, 41 pages.

Langville, et al., "A Survey of Eigenvector Methods for Web Information Retrieval," The SIAM Review, 47(1), 2005, pp. 135-161, accessible at <<meyer.math.ncsu.edu/Meyer/PS_Files/Survey.pdf>>, 26 pages.

Neumann, et al., "ArcTrees: Visualizing Relations in Hierarchical Data," Eurographics—IEEE, VGTC Symposium on Visualization, 2005, pp. 53-60.

Orso, et al., "Classifying Data Dependences in the Presence of Pointers for Program Comprehension, Testing, and Debugging," ACM Transactions on Software Engineering and Methodology, vol. 13, Issue 2, 2004, pp. 199-239.

Gyongyi, et al., "Combating Web Spam with TrustRank," Proceedings of the Thirtieth international Conference on Very Large Data Bases, vol. 30, 2004, pp. 576-587.

Brandes, et al., "Communicating Centrality in Policy Network Drawings," IEEE Transactions on Visualization and Computer Graphics, vol. 9, No. 2, Apr.-Jun. 2003, pp. 241-253.

Sawant, et al., "DiffArchViz : A Tool to Visualize Correspondence Between Multiple Representations of a Software Architecture," 4th IEEE International Workshop on Visualizing Software for Understanding and Analysis, 2007, pp. 121-128.

Dwyer, et al., "Drawing Directed Graphs Using Quadratic Programming", IEEE Transactions on Visualization and Computer Graphics, vol. 12, No. 4, Jul./Aug. 2008, pp. 536-548.

Yehuda Koren, "Drawing Graphs by Eigenvectors: Theory and Practice," Computers and Mathematics with Applications, 49(11-12), 2005, accessible at <<www.research.att.com/~yehuda/pubs/spectral_journal.pdf>>, 28 pages.

Nachmanson, et al., "Drawing Graphs with GLEE," Proceedings of the 15th International Symposium on Graph Drawing, 2007, pp. 389-394, accessible at <<research.microsoft.com/research/pubs/view.aspx?type=Technical/%20Report&id=1314>>, 12 pages.

Brandes, et al., "Eigensolver Methods for Progressive Multidimensional Scaling of Large Data," Proceedings of the 14th International Symposium on Graph Drawing, 2006, accessible at <<www.inf.uni-konstanz.de/cgip/bib/files/BrPi06.pdf>>, 12 pages.

Kamvar, et al., "Exploiting the Block Structure of the Web for Computing PageRank," Technical Report, Stanford University, accessible at <<www.stanford.edu/~sdkamvar/papers/blockrank.pdf>>, 2003, 13 pages.

Gansner, et al., "Graph Drawing by Stress Majorization," Proceedings of the 12th International Symposium on Graph Drawing, 2004, pp. 239-250.

Eades, et al., "Graph-Drawing Contest Report," Mitsubishi Research Laboratories, Technical Report TR96-24, 1996, 17 pages.

Danny Holten, "Hierarchical Edge Bundles: Visualization of Adjacency Relations in Hierarchical Data," IEEE Transactions on Visualization and Computer Graphics, vol. 12, Issue 2, 2006, pp. 741-748.

Bevan, et al., "Identification of Software Instabilities," Proceedings of the 10th Working Conference on Reverse Engineering, 2003, 10 pages.

Dwyer, et al., "IPSEP-COLA: An Incremental Procedure for Separation Constraint Layout of Graphs," IEEE Transactions on Visualization and Computer Graphics, vol. 12, Issue 5, 2006, pp. 821-828.

Bastert, et al., "Layered Drawings of Digraphs," in M. Kaufmann and D. Wagner, Eds., Drawing Graphs, 2001, pp. 87-120.

Storey, et al., "Manipulating and Documenting Software Structures Using SHriMP Views," Proceedings of the International Conference on Software Maintenance, 1995, pp. 275-284.

Ahmed, et al., "Navigation Techniques for 2.5D Graph Layout," Proceedings of the Asia-Pacific Symposium on Visualisation, 2007, pp. 81-84.

Lanza, et al., "Polymetric Views—A Lightweight Visual Approach to Reverse Engineering," IEEE Transactions on Software Engineering, vol. 29, No. 9, 2003, pp. 782-795.

Schroter, et al., "Predicting Component Failures at Design Time," ISESE'06, Rio de Janeiro, Brazil, Sep. 21-22, 2006, ACM Document No. 1-59593-218-6/06/0009, 10 pages.

Zimmermann, et al., "Predicting Defects using Network Analysis on Dependency Graphs", ICSE'08, Leipzig, Germany, May 10-18, 2008, ACM Document No. 978-1-60558-079-1/08/05, pp. 531-540.

Bay, et al., "Reuse Frequency as Metric for Dependency Resolver Selection," presentation given Nov. 29, 2005, Frie University, Berlin, 15 pages.

Storey, et al., "Rigi: A Visualization Environment for Reverse Engineering," Proceedings of the 19th International Conference on Software Engineering, 1997, accessible at <<http://www2.umassd.edu/SWPI/uvic/icse97.pdf>>, 2 pages.

Dwyer, et al., "Stress Majorization with Orthogonal Ordering Constraints," Technical Report, Aug. 2005, accessible at <<http://www.csse.monash.edu.au/~tdwyer/LayoutWithOrthConstraints.pdf>>, 15 pages.

Ferrante, et al., "The Program Dependence Graph and its Use in Optimization," ACM Transactions on Programming Languages and System, vol. 9, No. 3, Jul. 1987, pp. 319-349.

Taher H. Haveliwala, "Topic-Sensitive PageRank: A Context-Sensitive Ranking Algorithm for Web Search," IEEE, 2002, accessible at <<http://www-cs-students.stanford.edu/~taherh/papers/topic-sensitive-pagerank-tkde.pdf>>, 22 pages.

Nagappan, et al., "Using Software Dependencies and Churn Metrics to Predict Field Failures: An Empirical Case Study," First International Symposium on Empirical Software Engineering and Measurement, 2007, pp. 364-373.

Brandes, et al., "Visualization of Bibliographic Networks with a Reshaped Landscape Metaphor," Joint Eurographics—IEEE TCVG Symposium on Visualization, 2002, 7 pages.

Consens, et al., "Visualizing and Querying Software Structures," Proceedings of the 14th International Conference on Software Engineering, 1992, pp. 138-156.

Padmanabhan, et al., "WICER: A Weighted Inter-Cluster Edge Ranking for Clustered Graphs", accessible at <<http://www-users.cs.umn.edu/~desikan/publications/WebIntelligence2005.pdf>>, 2005, 7 pages.

Koren, et al. "One-dimensional layout optimization with applications to graph drawing by axis separation," Computational Geometry: Theory and Applications, 2005, 27 pages.

Sugiyama, et al., "Methods for Visual Understanding of Hierarchical System Structures," IEEE Transactions on Systems, Man, and Cybernetics, 11(2), 1981, pp. 109-125.

Duncan, et al. "Graph-Drawing Contest Report," Proceedings of the 14th International Symposium on Graph Drawing, 2006, pp. 42-53, first page provided only.

Pich, C. et al.; "Visual Analysis of Importance and Grouping in Software Dependency Graphs"; Proceedings of the 4th ACM Symposium on Software Visualization; Sep. 16-17, 2008; Herrsching am Ammersee, Germany; pp. 29-32.

Herman, et al., "Graph Visualization and Navigation in Information Visualization: A Survey," IEEE Transactions on Visualization and Compute Graphics, vol. 6, Issue 1, Jan. 2000; pp. 24-43.

"Multidimensional Scaling," accessible at <<http://www.analytictech.com/networks/mds.htm>>, 2008; 8 pages.

Jeh, et al., "Scaling Personalized Web Search," Proceedings of the 12th International Conference on World Wide Web; 2003; pp. 271-279.

Jungmayr, S.; "Testability Measurement and Software Dependencies"; Proceedings of the 12th International Workshop on Software Measurement; Oct. 7-9, 2002; Magdeburg, Germany; pp. 179-202.

Page, L. et al., "The PageRank Citation Ranking: Bringing Order to the Web"; Stanford Digital Library Technologies Project; Jan. 29, 1998; 17 pages.

DeLine, R. et al., "Towards Understanding Programs through Wear-based Filtering," Proceedings of the 2005 ACM Symposium on Software Visualization; 2005; pp. 183-192.

Brandes, U. et al., "Visual Ranking of Link Structures", Proceedings of the 7th International Workshop on Algorithms and Data Structures; 2001; Springer-Verlag, London, UK; pp. 222-233.

Storey, M. et al., "Manipulating and Documenting Software Structures," Proceedings of the International Conference on Software Maintenance; 1995; IEEE Computer Society; Washington, DC; pp. 275-295.

Podgurski, A. et al., "A formal model of program dependencies and its implications for software testing, debugging, and maintenance," IEEE transactions on Software Engineering, vol. 16, No. 9; 1990; pp. 965-979.

AT&T graph collection, home access page, accessible at <<http://www.graphdrawing.org/data/index.html>>, downloaded Sep. 8, 2008; 1 page.

* cited by examiner

VISUALIZING RELATIONSHIPS AMONG COMPONENTS USING GROUPING INFORMATION

BACKGROUND

Directed graphs often include a large number of nodes (also referred to as vertices), with complex dependencies (referred to as edges or arcs) connecting the nodes together. This raises challenges for a user who wishes to render a visual depiction of the graph. In some cases, the results are too complex and cluttered to provide meaningful insight into the characteristics of the graph. Alternatively, or in addition, the processing of a large graph may be time-consuming and resource-intensive.

Consider, for example, the visualization of a directed graph that represents a software system. In this case, the nodes of the graph may represent the components of the system, while the edges may represent relationships among the components. The literature has proposed the visualization of such graphs for various purposes. For instance, the visualization can be used to help explain the system to a new user, to optimize the system, to test the system, to detect instabilities and failures in the system, and so on. However, many software systems are extremely complex, including potentially many thousands of software components. It is a challenging task to convey salient information pertaining to the graph in visual form.

SUMMARY

A graph processing module is described for visualizing relationships among components, such as, but not limited to, software components within a software system. The graph processing module operates by receiving graph information associated with a plurality of components. The graph processing module also receives grouping information that identifies groups of components. The graph processing module generates grouping results based on analysis of the graph information and the grouping information. The graph processing module then performs component-level analysis based on the graph information and the group results, such that group results are used to bias the component-level analysis. The graph processing module then presents a visualization of the results of the component-level analysis.

According to one illustrative aspect, the biasing effect of the group results provides insight regarding the relationships among components. More specifically, the biasing effect controls an affinity of components within each group to other members of the group, which competes with group-agnostic dependencies among individual components. One or more parameters can be used to control the extent to which the group results are used to bias the component-level analysis. For instance, a user may adjust such a biasing parameter to metaphorically "pull" components within the groups inwards towards their respective groups. This may help reduce the clutter in the displayed graph and help the user gain better insight regarding the roles of groups within the system.

According to another illustrative aspect, the component-level analysis can involve assessing the similarity among components. In one case, this type of component-level analysis can be performed using multidimensional scaling (MDS).

According to another illustrative aspect, the component-level analysis can also involve assessing the importance of components. In one case, this type of component-level analysis can be performed using a network page ranking algorithm.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth an approach for visualizing a graph. In one case, the graph presents information regarding the relationships among software components of a software system. The approach uses grouping information to help reduce clutter in the visualization of the graph, so as to better convey salient features of the graph.

This disclosure is organized as follows. Section A describes an illustrative system for visualizing a graph. Section B describes illustrative methods which explain the operation of the system of Section A. Section C describes illustrative visualizations that may be produced by the system of Section A. And Section D describes illustrative processing functionality that can be used to implement any aspect of the features described in preceding sections.

Figure 12:
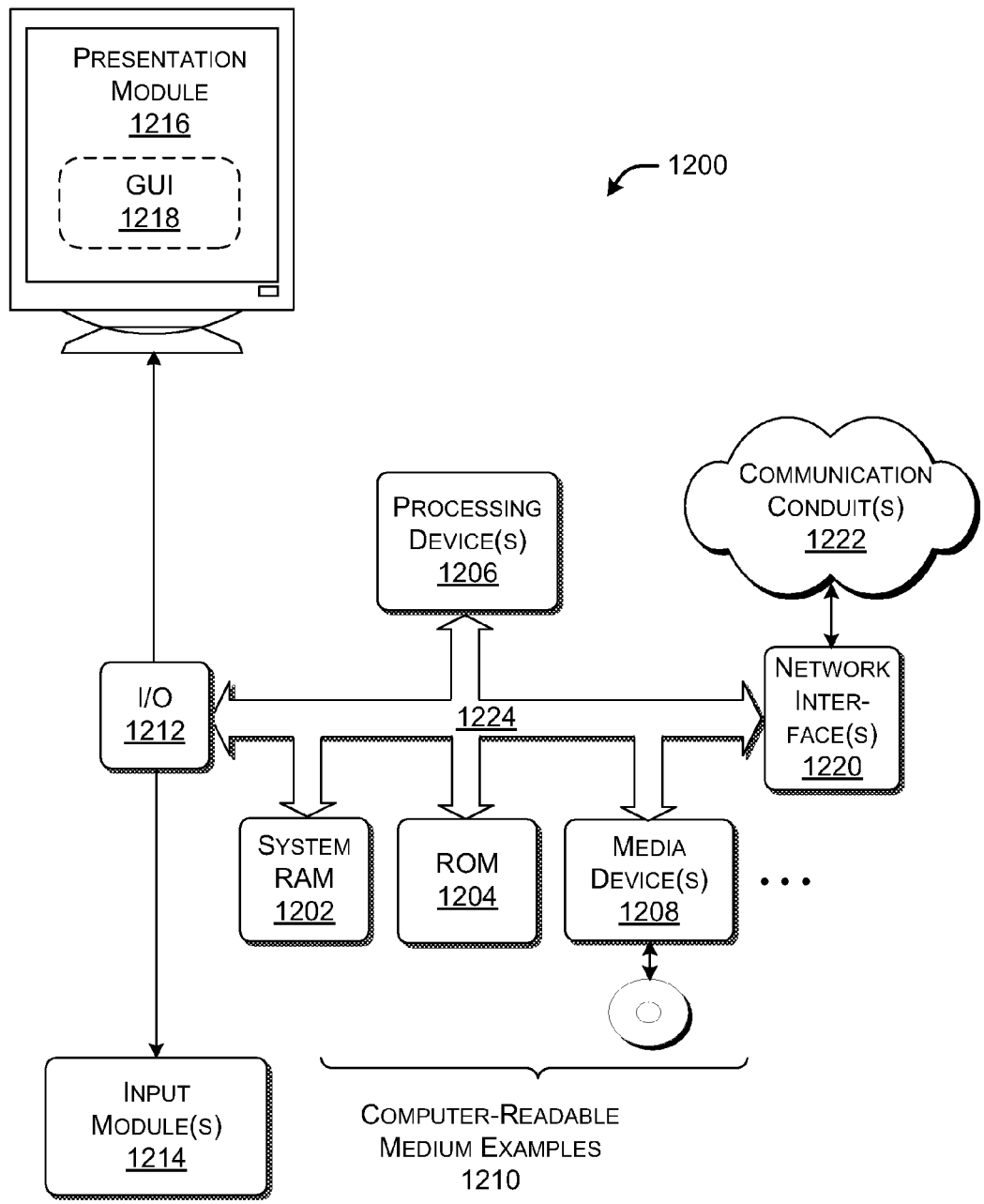
FIG. 12 shows illustrative processing functionality that can be used to implement any aspect of the features shown in the foregoing drawings.

As a preliminary matter, some of the figures describe the concepts in the context of one or more components, variously referred to as functionality, modules, features, elements, etc. The various components shown in the figures can be implemented in any manner, for example, by software, hardware, firmware, manual processing operations, and so on, or any combination of these implementations. In one case, the illustrated separation of various components in the figures into distinct units may reflect the use of corresponding distinct physical components. Alternatively, or in addition, any single component illustrated in the figures may be implemented by plural physical components. Alternatively, or in addition, the depiction of any two or more separate components in the figures may reflect different functions performed by a single physical component. FIG. 12, to be discussed in turn, provides additional details regarding one illustrative implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein. The blocks shown in the flowcharts can be implemented by software, firmware, hardware, manual processing, any combination of these implementations, and so on.

As to terminology, the phase "configured to" encompasses any way that any kind of functionality can be constructed to perform an identified operation. The functionality can be configured to perform an operation using, for instance, hardware, software, firmware, etc., and/or any combination thereof.

The term "logic" encompasses any functionality for performing a task. For instance, each operation illustrated in the flowcharts corresponds to logic for performing that operation. In one case, logic may correspond to computer-readable instructions. In another case, logic may correspond to discrete logic components, or a combination of discrete logic components and computer-readable instructions.

A. Illustrative System

Figure 1:
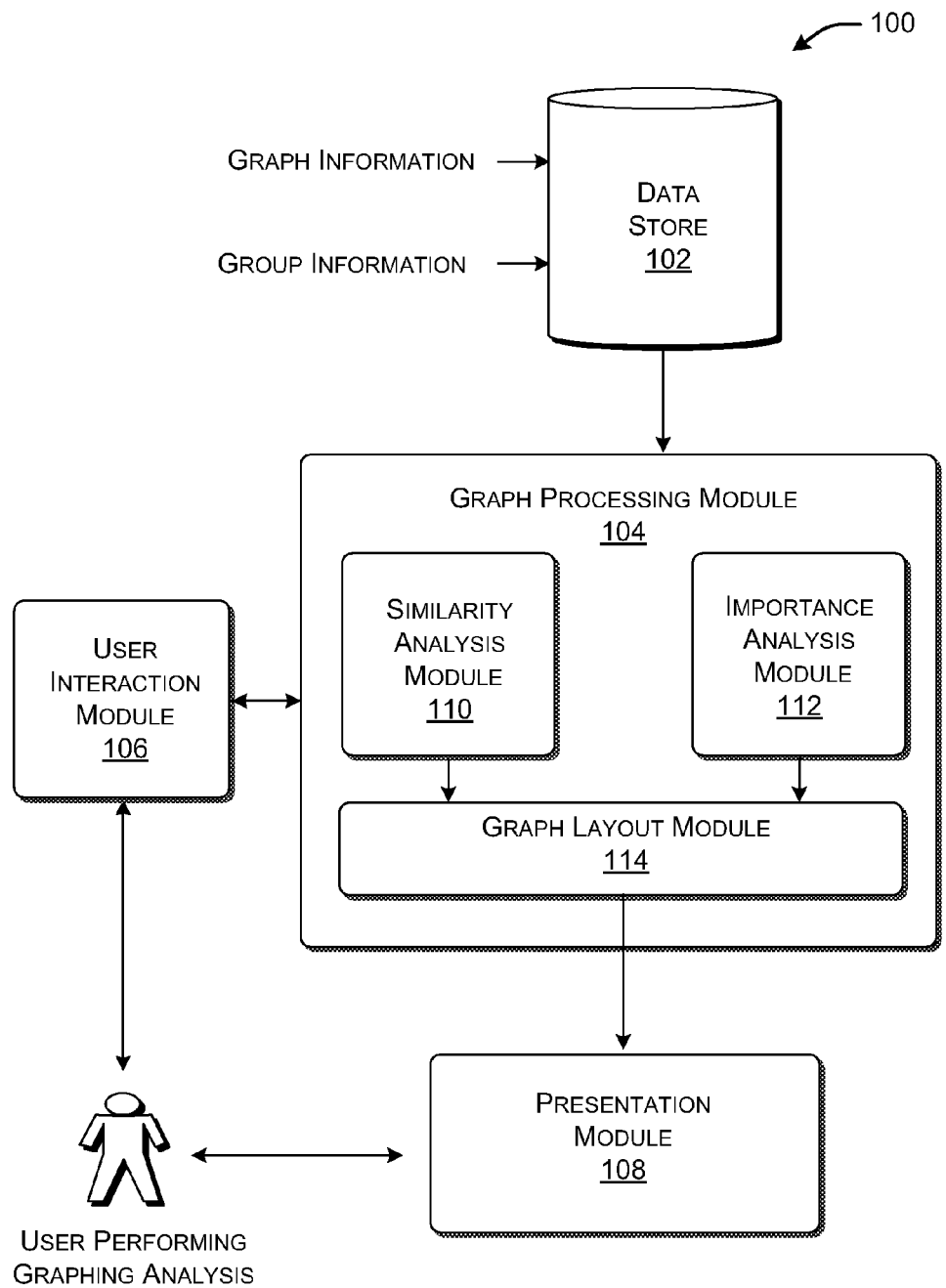
FIG. 1 shows an illustrative system for visualizing a directed graph.

FIG. 1 shows an illustrative system 100 for visualizing a directed graph. As mentioned above, a directed graph G is characterized by a set of nodes or vertices (V) as well as a set of relationships (or edges) (E) among the nodes. In other words, G=(V, E). An edge connecting any two nodes is considered directed if it is directed from one of the nodes to the other. An undirected graph, by contrast, includes edges that are undirected.

The nodes and edges may map to various physical systems in different respective environments. In one example, the nodes correspond to components in a software system and the edges refer to some type of relationship among the components. For example, consider the illustrative case of a large object-oriented software system that operates in a virtual machine environment. The classes in the software system may be considered as respective nodes. In one case, class i depends on class j if a compiler needs a compiled version of class j to compile class i. This is merely one example; in other software systems, the edges of the graph G may represent other kinds of dependencies among software components. Further, other types of software systems may include other criteria for partitioning the software system into components (that is, besides the class criterion, or in addition to the class criterion).

The specific examples set forth below pertain to the case in which the graph G represents a software system. However, the concepts set forth here are not limited to this environment. In another application, for example, the nodes of the graph G may represent resources provided in a wide area network (WAN) environment, such as the Internet. In another example, the nodes of the graph G may represent the discrete components of a physical system. In another application, the nodes of the graph G may represent any kind of operational research entities, environmental entities, financial entities, and so on.

By way of overview, one use of the system 100 is to provide a visualization of the graph G. A user may wish to visualize the graph for any one or more of various reasons. For instance, the visualization can be used to help explain the system to a new user, to optimize the system, to the test the system, to detect instabilities and failures in the system, and so on. No limitation is placed herein on how the visualization of the graph G might be used.

With the above introduction, the individual features of FIG. 1 will be described in turn. To create a graph G, the system 100 must first obtain the information from which the graph G is constructed. A first type of information that is collected is graph information. A second type of information that is collected is grouping information. As used herein, the term "graph information" refers to any information regarding the graph G, such as information which identifies the nodes (e.g., components) in a software system, and information which identifies the edges (e.g., dependencies) in the software system. The "grouping information" refers to any information that identifies a manner in which the components of the software system may be grouped together. The criteria that govern how the components are grouped together can vary for different environments. In one case, a group may reflect a collection of components that share one or more characteristics (e.g., structural characteristics, functional characteristics, etc.). For example, consider the above-identified case in which the software system is a large object-oriented software system that operates in a virtual machine environment. The namespaces of this software system may identify different groups of components within this system. (A namespace identifies an abstract context for a group of components associated with the namespace). Other software systems may partition the components using file systems, packages, etc.

In one case, the system 100 can automatically identify the grouping information based on metadata within a body of information associated with the software system. Alternatively, or in addition, a user can manually specify the grouping information, e.g., by applying labels to the components which identify their group affiliations. Still other ways of identifying the grouping information are possible. In any case, a data store 102 may optionally be used to store the graph information and the grouping information prior to analysis.

A graph processing module 104 processes the graph information and grouping information provided in the data store 102 to provide a visualization of that information. The graph processing module 104 can correspond to any computing functionality or combination of computing functionality provided at any site or combination of sites. In a local implementation, the graph processing module 104 may correspond to a local computing device operated by a user, such as a personal computer, laptop computer, etc. In a remote implementation, the graph processing module 104 may correspond to network-accessible functionality which the user can access from a remote location (with respect to the functionality).

A user may interact with the graph processing module 104 using a user interaction module 106. The user interaction module 106 represents any device or combination of devices by which the user can control the operation of the graph processing module 104, such as a key input device, a mouse-type input device, etc. The graph processing module 104 can present the results of its analysis (referred to as layout results) using a presentation module 108. In the case most commonly evoked herein, the presentation module 108 may correspond to a visual output device, such as a computer monitor or the like. But the presentation module 108 can also encompass other types of output devices, such as a printer, storage device, etc.

More generally, in one case, the presentation module 108 can visually present the layout results by plotting the layout results on a displayed (or printed) graph having any number of dimensions. In other cases, the presentation module 108 can convey the layout results in other forms, such as in a table form, etc.

The graph processing module 104 itself can include (or can be conceptualized to include) multiple components. A similarity analysis module 110 performs similarity analysis. The similarity analysis determines the similarity among components in the software system. (As used herein, the term similarity is to be construed liberally; for instance, the similarity between two components can encompass a measure which identifies the dissimilarity between the two components.) In one illustrative and non-limiting case, one component can be considered similar to another component if it is connected to the other component by a relatively short path of dependencies within the graph G. The similarity analysis is undirected in the sense that it does not take into account the direction of dependencies within the graph G. In one case, the goal of the similarity analysis is to enable the graph processing module 104 to present a visualization of the graph G in which similar components are placed close together and dissimilar components are placed far apart (where the extent of the similarity and dissimilarity depends how close the components are placed with respect to each other).

Although examples will be presented herein that define similarity in terms of graph-theoretical distance, the similarity analysis module 110 can use other techniques (or combination of techniques) to assess similarity (where, as stated above, the term similarity is intended to also encompass analysis of dissimilarity). For example, resistance distance can be used to determine similarity (dissimilarity) between components. In this technique, a graph is likened to an electrical network. The distance between two components is likened to the effective electrical resistance between the components.

An importance analysis module 112 performs importance analysis. The importance analysis determines the importance of components in the software system. More specifically, in one case, a component can be considered to be important if it performs an important role in the software system. One way of gauging the importance of a component is by identifying how many other components depend on it, and, in turn, whether these dependent components are themselves important. The importance analysis is directed in the sense that it takes into account the direction of dependencies within the graph G. Generally stated, the goal of the importance analysis is to enable the graph processing module 104 to present a visualization of the graph G in which important components are positionally separated from unimportant components (where the relative difference in importance between components determines how far the components are placed from one another.

A graph layout module 114 presents the layout results produced by the similarity analysis module 110 and the importance analysis module 112. In one case, the layout results provided by the similarity analysis module 110 and the importance analysis module 112 can correspond to one or more dimensions of a graphical visualization of the layout results. For example, an x dimension of the visualization can correspond to the assessed similarity among components. Other dimensions of the visualization (e.g., y, z, etc.) can correspond to other respective dimensions of the assessed similarity among components, if, in fact, the similarity analysis provides a multi-dimensioned analysis of similarity among components. Likewise, an importance dimension of the visualization can correspond to the assessed relative importance among components. To facilitate discussion, FIGS. 8-11 (to be discussed in turn) present an example in which the similarity among components is represented by the horizontal dimension of the visualization, while the importance of the components is represented by the vertical dimension of the visualization. But, as stated, the visualization can include any number of dimensions.

Both the similarity analysis module 110 and the importance analysis module 112 perform component-level analysis on the graph G in a manner that is biased by the grouping information. Broadly, the grouping information has the effect of increasing the "affinity" of components in each group to each other, thereby, metaphorically pulling the components in towards their respective groups. This type of bias may work against group-agnostic dependencies among components. For instance, the group-agnostic dependencies may metaphorically pull a component within one group towards a component within another group, if, in fact, there is an inter-group dependency among these two components. One or more biasing parameters (denoted by ω herein) control the extent of the influence of the grouping information within the visualization.

More detail regarding the way in which the grouping information impacts the analysis provided by the graph processing module 104 will be provided in the following Section B below. As a point of clarification, the implementations described below will describe the application of the grouping information to both the similarity analysis module 110 and the importance analysis module 112. But, in other implementations, either the similarity analysis module 110 or the importance analysis module 112 can make use of the grouping information (but not both). Still more generally, any analysis module can make use of the grouping information. That is, the general concepts disclosed herein are not limited to the specific kinds of analysis modules set forth in Section B.

B. Illustrative Processes

Figure 2:
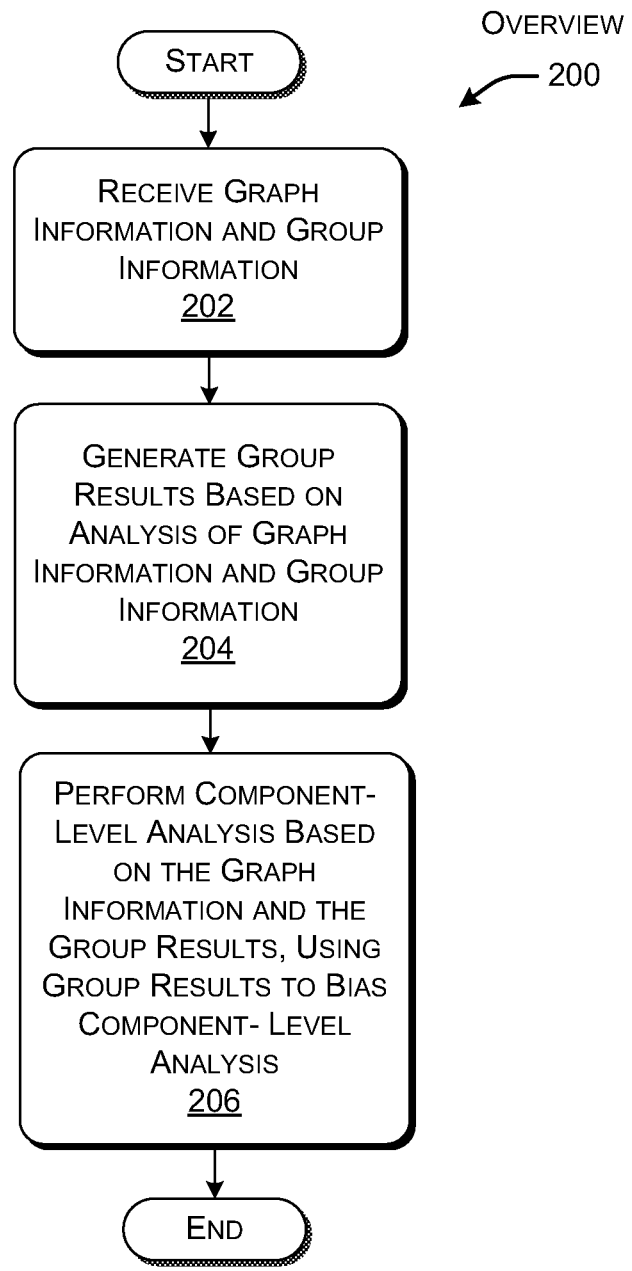
FIG. 2 shows an illustrative procedure that provides an overview of one manner of operation of the system of FIG. 1.
Figure 3:
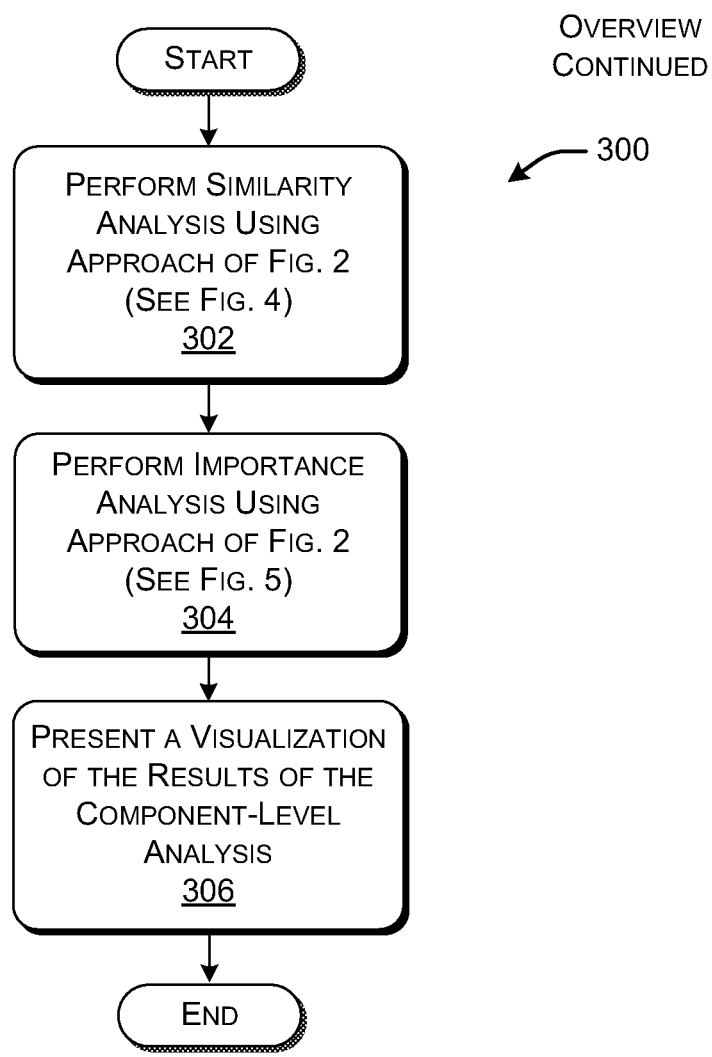
FIG. 3 shows an illustrative procedure that provides additional overview information regarding the operation of the system of FIG. 1.
Figure 4:
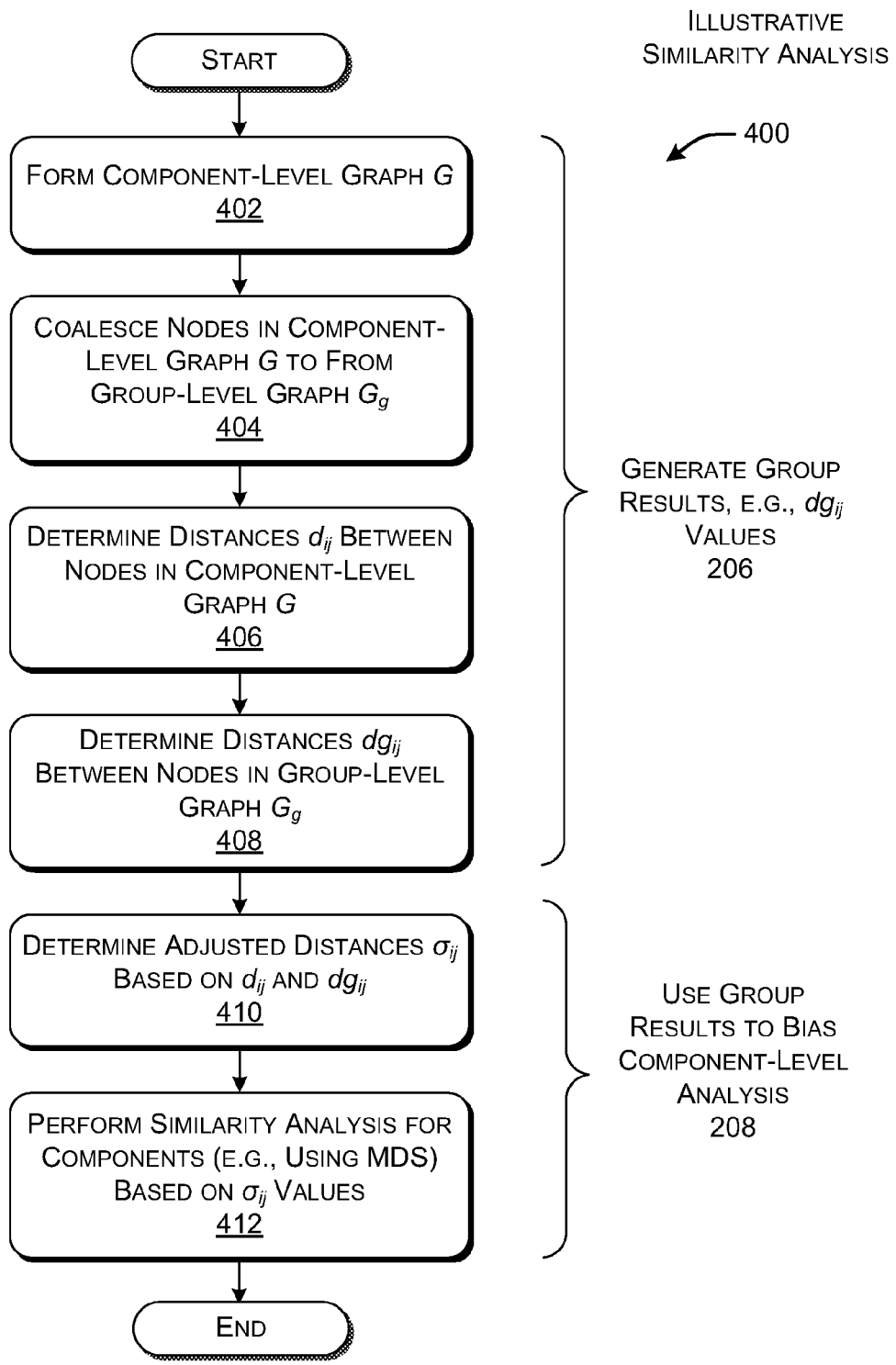
FIG. 4 shows an illustrative procedure for performing similarity analysis within the overview procedure of FIG. 3.
Figure 5:
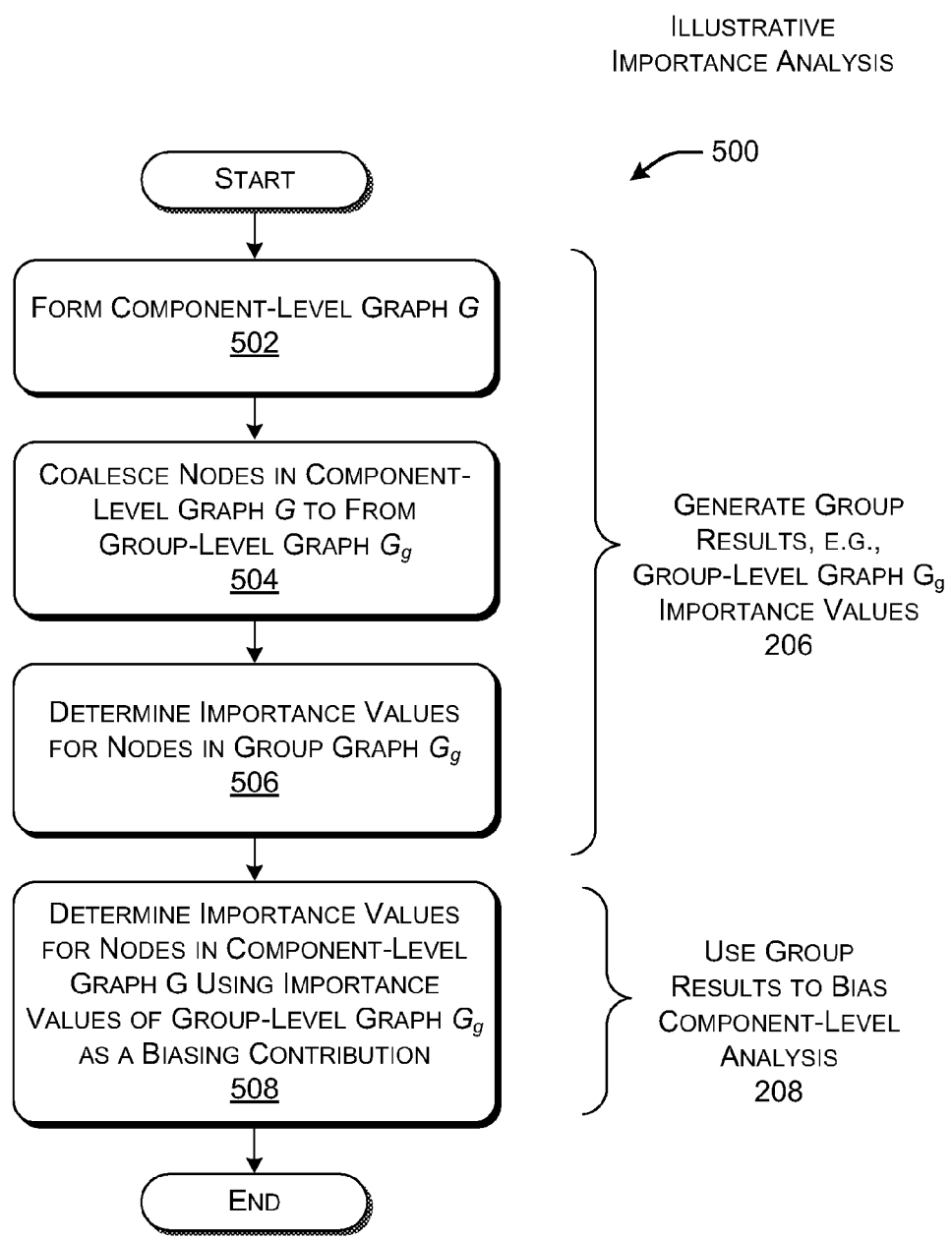
FIG. 5 shows an illustrative procedure for performing importance analysis within the overview procedure of FIG. 3.

FIGS. 2 and 3 show procedures (200, 300) which provide an overview of the operation of the system 100 of FIG. 1. FIGS. 4 and 5 provide additional illustrative details that explain how the general operations in FIGS. 2 and 3 can be implemented (in one representative implementation). That is, FIG. 4 shows one manner of operation of the similarity analysis module 110 and FIG. 5 shows one manner of operation of the importance analysis module 112.

Beginning with FIG. 2, block 202 entails receiving graph information and grouping information. In the illustrative application to a software system, the graph information identifies the components within the software system and the dependencies among the components. The grouping information identifies the manner in which the components are grouped together. In one case, the grouping information can be automatically extracted from metadata associated with software system. Alternatively, or in addition, a user may manually supply the grouping information.

Block 204 entails generating what are generically referred to as "group results" herein based on the graph information and grouping information. Broadly, the group results refer to any kind of results that are derived based on the graph information and the grouping information. The discussion of FIGS. 4 and 5 will describe what the group results may correspond to in two specific illustrative contexts.

Block 206 entails performing component-level analysis based on the graph information and the group results. The component-level analysis refers to analysis performed on the graph G on a component-level basis, as opposed to analysis performed on a group-level basis (to be discussed below). The component-level analysis is biased by the group results, meaning that the grouping information is used to influence the component-level analysis performed on the graph G.

The process 300 of FIG. 3 conveys that the procedure 200 of FIG. 2 is performed by both the similarity analysis module 110 and the importance analysis module 112.

More specifically, block 302 entails using the approach of FIG. 2 to perform similarity analysis. In this context, the grouping information is used to bias the similarity analysis.

Block 304 entails using the approach of FIG. 2 to perform importance analysis. In this context, the grouping information is used to bias the importance analysis.

Block 306 entails presenting a visualization of the layout results produced by the similarity analysis and the importance analysis. In one case, at least one dimension of the visualization may represent the similarity of the components. At least one other dimension of the visualization may represent the importance of the components. The grouping information has the effect of emphasizing the relatedness of the components to their respective groups, which competes with the group-agnostic dependencies among components.

Figure 6:
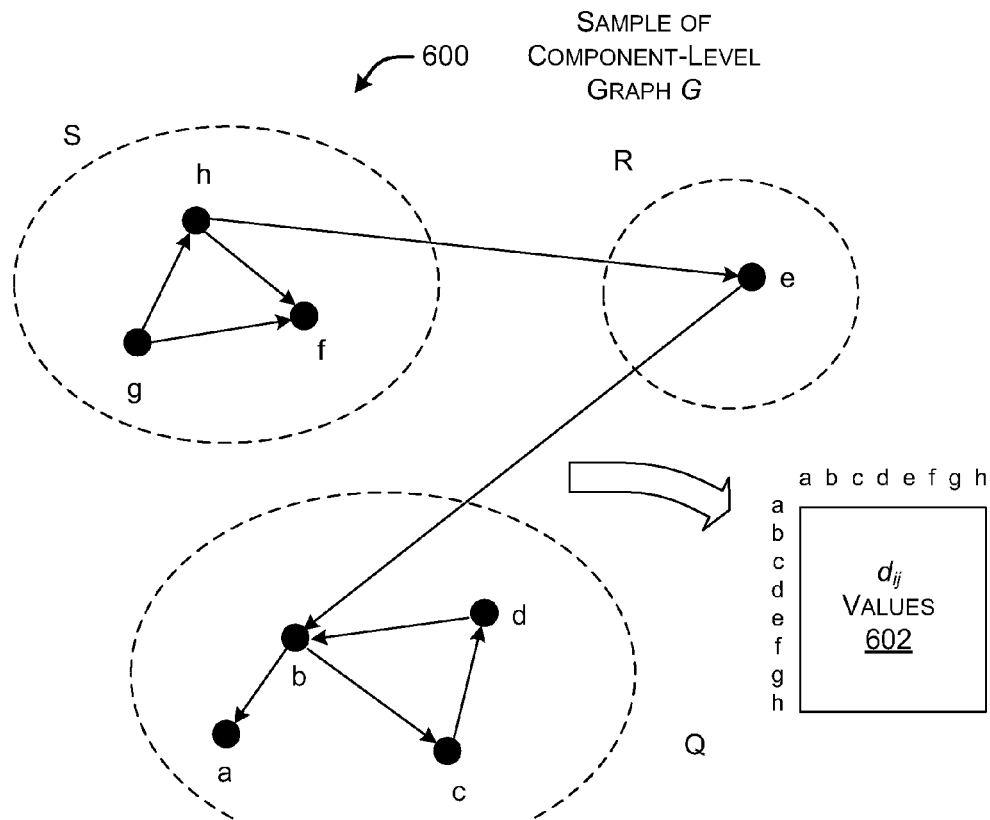
FIG. 6 shows a small sample of an illustrative component-level graph G.
Figure 7:
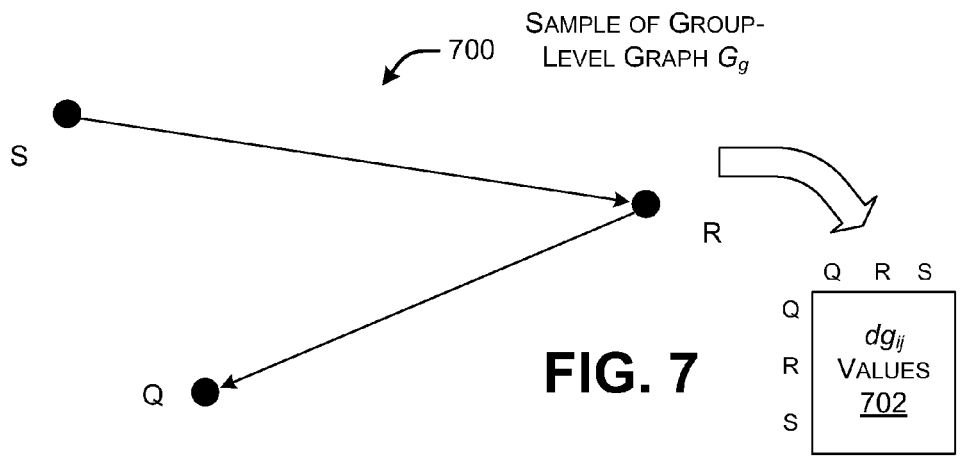
FIG. 7 shows a small sample of an illustrative group-level graph $G_g$.

FIGS. 4 and 5 present more detailed information regarding how the grouping information can be applied to the similarity analysis (as per procedure 400 in FIG. 4) and the importance analysis (as per procedure 500 in FIG. 5). FIGS. 6 and 7 help clarify the concepts identified in the procedures (400, 500); thus, FIGS. 4 and 5 will be explained in parallel with the graphical illustrations of FIGS. 6 and 7.

As another introductory note, FIGS. 4 and 5 present a series of operations presented in a defined order. It should be emphasized that this order is merely illustrative and intended to facilitate explanation. The order of these operations can be changed in various ways; moreover, various operations can be performed in parallel.

Further, in these figures, the group-theoretical distance is used to assess similarity between components. However, as explained above, the similarity analysis module 110 can use other ways (or combination of ways) to assess similarity (dissimilarity) between components.

Beginning with the similarity analysis of FIG. 4, block 402 entails forming a component-level graph G. The graph G is henceforth referred to as a component-level graph to distinguish it from a group-level graph $G_g$. FIG. 6 shows a small sample of a component-level graph G 600 having 8 nodes (labeled nodes a, b, c, d, e, f, g, and h). The nodes may represent the components (e.g., classes) of a software system. In one case, each edge that connects one node to another has a unitary distance (e.g., a value of 1).

Block 404 entails coalescing the nodes in the component-level graph G to form a group-level graph $G_g$. For instance, FIG. 6 shows that the grouping information identifies three groups of components (labeled groups Q, R, and S). Each group includes a collection of one or more components that share some characteristic or combination of characteristics. For example, the groups may correspond to respective collections of components that belong to associated namespaces. Block 404 entails coalescing the three groups in FIG. 6 into a single representative node for each group, which yields the group-level graph $G_g$ 700 of FIG. 7. The group-level graph $G_g$ thus has three nodes (labeled as node Q, R, and S).

Block 406 entails determining the distances $d_{ij}$ between nodes in the component-level graph G. That is, the distance $d_{ij}$ identifies the shortest distance between any node i and any node j in the component-level graph 600. FIG. 6 shows that these distances $d_{ij}$ can be formulated into a symmetric table 602. For example, the distance $d_{a,c}$ between nodes a and c is 2 because the length of a shortest path connecting a and b in the graph is 2. The distance $d_{a,g}$ between nodes a and g is 4 because the length of a shortest path connecting a and g in the graph is 4 and so on. The path length can be measured in the number of the path edges.

Block 408 entails determining the distances $dg_{ij}$ between nodes in the group-level graph $G_g$. That is, in this example, the distance $dg_{ij}$ identifies the shortest distance between the group containing node i and the group containing j in the group-level graph 700. FIG. 7 shows that these distances $dg_{ij}$ can be formulated into a symmetric table 702. For example, the group distance $dg_{a,g}$ between nodes a and g is 2 because node a is a member of group Q and node g is a member of group S, and the length of a shortest path connecting Q and S is 2.

Block 410 entails computing adjusted distances $\sigma_{ij}$ based on the component-level distances $d_{ij}$ and the group-level distances $dg_{ij}$. One approach to computing the adjusted distances $\sigma_{ij}$ is provided by:

$$\sigma_{ij} = \omega dg_{ij} + (1-\omega)d_{ij} \qquad (Eq. 1).$$

Here, $\omega$ corresponds to a biasing parameter; the other variables have been described above. Effectively, this equation provides a complex combination of $d_{ij}$ and $dg_{ij}$, with the biasing factor $\omega$ determining the extent to which the $dg_{ij}$ value controls the adjusted distance $\sigma_{ij}$. The adjusted distance $\sigma_{ij}$ can be computed for each node in the component-level graph G to provide a symmetric table analogous to table 602, but in this case, the distances in the table will be offset based on the grouping analysis performed in block 408.

Block 412 entails performing similarity analysis on the components in the component-level graph G based on the adjusted distances $\sigma_{ij}$. The similarity analysis generally determines how to lay out the components within the visualization based on the adjusted distances $\sigma_{ij}$. One algorithm for performing this analysis is multidimensional scaling (MDS), such as classical MDS. Classical MDS operates on an input matrix of distances (in the specific case of FIG. 4, the distances $\sigma_{ij}$) to generate an output coordinate matrix. The classical MDS algorithm produces the coordinate matrix by minimizing a strain parameter. The use of classical MDS is merely one example; other implementations can use other algorithms to operate on the adjusted distances $\sigma_{ij}$.

The operations shown in FIG. 4 can be correlated with the overview shown in FIG. 2. Blocks 402-408 culminate in the computing of the distances $dg_{ij}$ between the nodes in the group-level graph $G_g$. These operations correspond to block 206 of FIG. 2, which corresponds to generating group results based on the graph information and the grouping information; in other words, the distances $dg_{ij}$ constitute the group results. Blocks 410 and 412 involve using the distances $dg_{ij}$ to first provide adjusted distances $\sigma_{ij}$, and then using the adjusted distances $\sigma_{ij}$ to bias the similarity analysis (e.g., using classical MDS analysis in one case). These operations correspond to block 208 in FIG. 2, which corresponds to using the group results to bias the similarity analysis.

Advancing to FIG. 5, this figure shows a procedure 500 for performing the importance analysis.

Blocks 502 and 504 correspond to forming a component-level graph G, and then coalescing the nodes of the component level graph G to form a group-level graph $G_g$. These two operations correspond to blocks 402 and 404 of FIG. 4, as illustrated in FIGS. 6 and 7. Blocks 502 and 504 repeat these two operations to clarify the explanation of the procedure 500 of FIG. 5; but, in practice, the component-level graph G and group-level graph $G_g$ need only be formed once; that is, these graphs (G, $G_g$) can be used for both the similarity analysis of FIG. 4 and the importance analysis of FIG. 5. (Thus, in one implementation, it may be appropriate to draw a two-headed arrow between the similarity analysis module 110 and the importance analysis module 112 of FIG. 1.) Note, however, that the direction of the edges has a bearing on the importance analysis, but not the similarity analysis (because the similarity analysis is not concerned with the direction of the dependencies among nodes).

As a point of clarification, the example of FIG. 6 shows that there is only one edge connecting group Q and group R, and only one edge connecting group R and group S. But there can be more than one edge connecting these groups. If there are two or more edges connecting two groups having the same direction, then the coalescing operation will retain one representative edge. In another scenario, the edges can have opposite directions; for example, there can be a first edge that points from group Q to group R and a second edge that points from group R to group Q. In this case, when coalescing the nodes of the component-level graph G to form the group-level graph $G_g$, both edges can be retained.

Block 506 entails determining importance values for the nodes in the group-level graph $G_g$. Generally speaking, the importance values identify the relative importance of the coalesced group nodes (e.g., group nodes Q, R, and S) in the group-level graph $G_g$.

Different algorithms can be used to assess the importance of nodes. In one approach, a network page ranking algorithm can be used to assess importance. Such algorithms were originally developed to rank the importance of pages in a wide area network, such as the Internet. In the context of one well known page ranking algorithm, a page X under consideration is considered important in proportion to the number of other pages (L, M, N, etc.) that link to it. The pages (L, M, N, etc.) which link to the page X, in turn, have their own assessed level of importance. The importance of page X is also a function of the individual importance values associated with the pages (L, M, N, etc.) which link to it. The page ranking algorithm calculates the importance values of a collection of pages in a recursive procedure in which the importance values converge on a stable set of values. The importance value associated with any page can be interpreted as the probability that a user who is randomly surfing the Internet will navigate to that page.

More formally, in one implementation, the page rank p for a collection of nodes can be computed according to:

$$p = \alpha \cdot M^T p + (1-\alpha) \cdot \hat{p} \quad \text{(Eq. 2)}.$$

Here, M is the transition matrix of a graph G with elements that depend on the out-degrees of the nodes in the graph G (where the out-degree of a node i is associated with its outgoing dependencies). The parameter $\alpha$ is referred to as an escape parameter, and is often set to 0.85 (corresponding to the probability that a user will abandon his navigation within a linked collection of pages and randomly select another page). The biasing vector $\hat{p}$ identifies the a priori importance values in the graph. The biasing vector $\hat{p}$ can be set to a uniform probability distribution as:

$$\hat{p} = \left[\frac{1}{n}, \ldots, \frac{1}{n}\right]^T, \quad \text{(Eq. 3)}$$

where n refers to a number of nodes in the graph.

The importance of each page can be determined by setting $p^{(0)} = \hat{p}$ and recursively calculating the following equation:

$$p^{(t+1)} \leftarrow \alpha M^T p^{(t)} + (1-\alpha) \cdot \hat{p} \quad \text{(Eq. 4)}.$$

That is, equation (4) is repeated until the probabilities converge to stable values.

In the context of the importance analysis of FIG. 5, block 506 can use equation (2) to compute the importance values for each node in the group-level graph $G_g$. Here, each node is analogous to a page. In this calculation, the biasing vector $\hat{p}$ can be set to the uniform probability distribution of equation (3), e.g., such that each node has an initial probability distribution of one third, because there are three nodes in the group-level graph $G_g$.

Now advancing to block 508, this operation entails determining the importance values of each node in the component-level graph G. One approach to calculating these values is using equation (2) described above. In this operation, however, the biasing vector is not set in a uniform manner, but is made dependent on the importance values calculated for the nodes of the group-level graph $G_g$ in block 506. In one case, the biasing vector used in block 508 can be calculated as:

$$\hat{p}_i = \frac{p^g_{g(i)}}{\sum_{i=1}^{n} p^g_{g(i)}}. \quad \text{(Eq. 5)}$$

Here, $\hat{p}_i$ refers to the a priori probability of each node i in the component-level graph G, and $p^g_{g(i)}$ refers to the group-level probability of the group g(i) in which node i is located (which was calculated in block 506). To cite one hypothetical example, suppose that block 506 determines that the probability of group node S in the group-level graph $G_g$ is 0.75. Then, in performing block 508, the a priori probability $\hat{p}_i$ that is applied to any node in group S of graph G is 0.75, instead of the uniform probability of $$\frac{1}{8}.$$

In effect, the group-level importance values calculated in block 506 operate to bias the component-level probability values calculated in block 508. For example, if a particular group is determined to be relatively important in block 506 (as in the above example of group S), the component-level analysis performed in block 508 for the nodes in the important group will receive a boost relative to the nodes of other (less important) groups.

The extent to which the group-level importance values affect the calculation of the component-level importance values is determined by the escape parameter $\alpha$. As such, in the context of the present disclosure, the escape parameter $\alpha$ can be redefined and relabeled as the above-described biasing parameter $\omega$. In one case, the biasing parameter $\omega$ that is used in the similarity analysis (in FIG. 4) can be set to the same value as the biasing parameter $\omega$ that is used for the importance analysis (of FIG. 5). But it is also possible to apply different values of the biasing parameter $\omega$ for the two different analyses. For that matter, it is possible to apply a different biasing parameter $\omega$ value to each separate dimension of analyses (for example, in the case in which the similarity analysis is performed for more than one dimension of similarity).

Once again, the operations shown in FIG. 5 can be correlated with the overview shown in FIG. 2. Blocks 502-506 culminate in the computing of the importance values for the component-level graph $G_g$. These operations correspond to block 206 of FIG. 2, which corresponds to generating group results based on the graph information and the grouping information; in other words, the group-level importance values constitute the group results. Block 508 involves using the group-level importance values to calculate the importance values for each node in the component level graph G. This operation corresponds to block 208 in FIG. 2, which corresponds to using the group results to bias the similarity analysis.

To emphasize, the use of the above-described network page ranking algorithm is representative. The importance analysis module 112 can make use of other algorithms to calculate the importance of the components, or combinations of multiple algorithms. For example, the importance analysis module 112 can assess importance using a reverse page ranking algorithm. A reverse page ranking algorithm emphasizes components with many outgoing dependencies (as opposed to incoming dependencies). Other algorithms for assessing importance can examine network flow, network connectivity, and so on.

C. Representative Output Results

FIGS. 8-11 show representative visualizations produced by the system 100 of FIG. 1. These visualizations are produced based on a directed graph G. The components in the directed graph G represent software components (e.g., classes) in a large software system. The lines connecting the components together represent dependencies among the software components. The grouping information identifies groups of components that correspond to respective namespaces in the software system.

The visualizations depict the graph using two dimensions. The horizontal dimension of the visualization corresponds to the assessed similarity among components (performed by the similarity analysis module 110). For example, the distance between two components along the horizontal dimension is related to the assessed similarity between these two components. The vertical dimension of the visualization corresponds to the assessed importance of the components (performed by the importance analysis module 112).

Once again, although only two dimensions are shown, it is possible to include more than two dimensions. For example, the similarity among components can be assessed in the context of two, three, or greater dimensions, and the visualization can be modified to present its results in the context of these additional dimensions. In one case, a user can explore analysis results that include more than two dimensions by selecting the dimensions that will be provided by the visualization. For example, a user may wish to first investigate two dimensions associated with the similarity analysis, without considering the importance dimension(s) of the analysis. The user may then wish to successively explore the importance dimension of the visualization in combination with a selected dimension of the similarity analysis (e.g., importance vs. the x dimension, importance vs. the y dimension, and so on).

FIGS. 8-11 show analysis performed on the same graph data for different values of the biasing parameter ω. In these examples, a single biasing parameter ω value can be applied to all dimensions of the visualization, but it is also possible to apply multiple biasing parameter values to different respective dimensions of the visualization.

Figure 8:
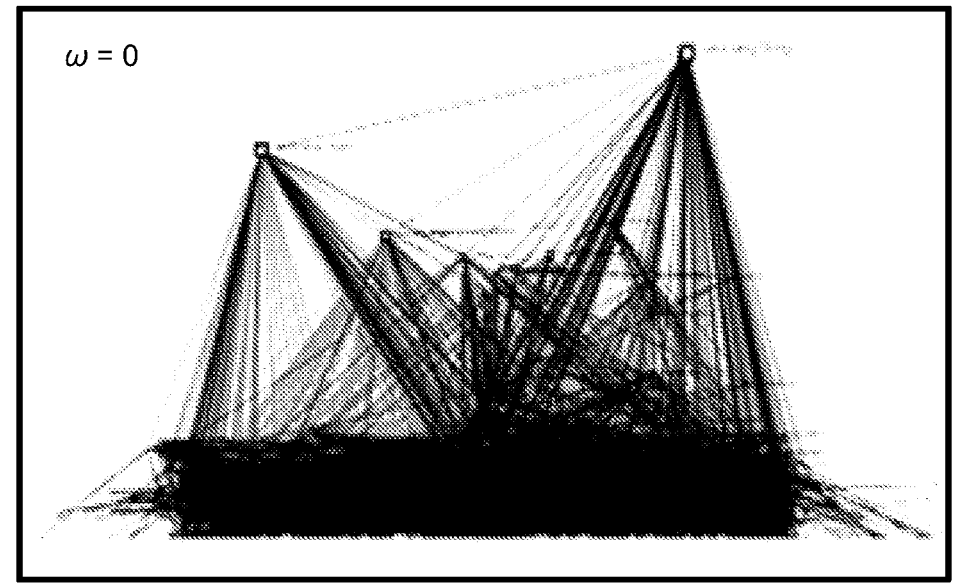
FIGS. 8-11 show illustrative visualizations that can be produced by the system of FIG. 1 for different values of a biasing parameter $\omega$.

In FIG. 8, the biasing parameter ω is 0. This means that the grouping information has no effect on the visualization. In other words, all the dependencies that are revealed in the visualization are attributed to group-agnostic dependencies among individual components.

Figure 9:
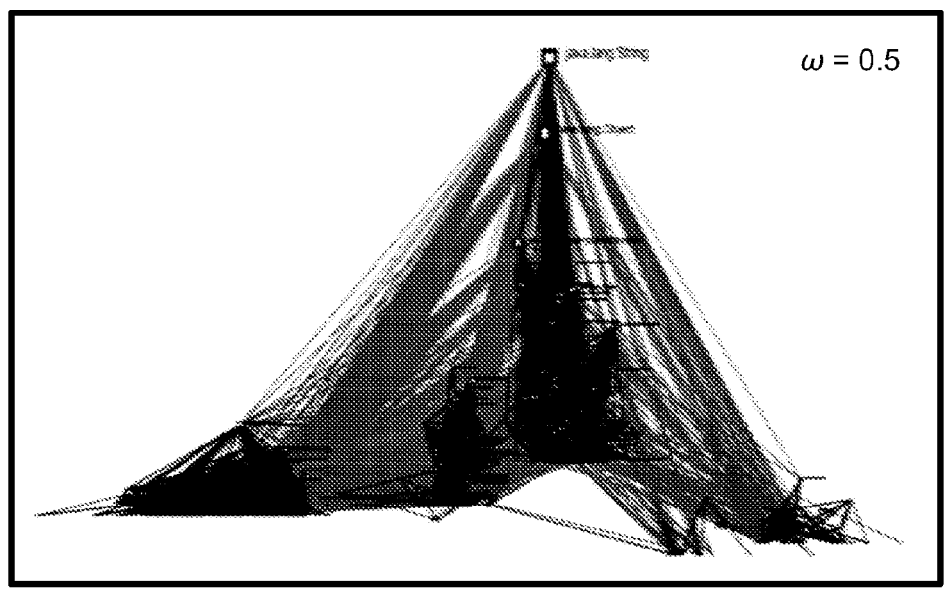
Figure 10:
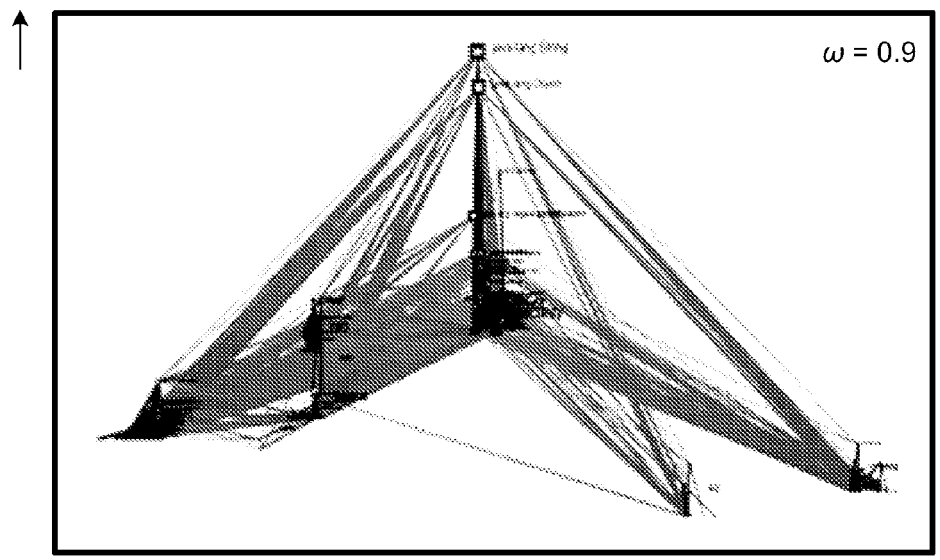

In FIG. 9 the biasing parameter ω is set to 0.5, while in FIG. 10 the biasing parameter ω is set to 0.9. Note that, as the biasing parameter ω is increased, the effects of the grouping information beginning to have a progressively greater effect on the layout of the components. Namely, as the biasing parameter ω is increased, the components are drawn inward toward their respective groups, against the group-agnostic (inter-group) dependencies among individual components.

Figure 11:
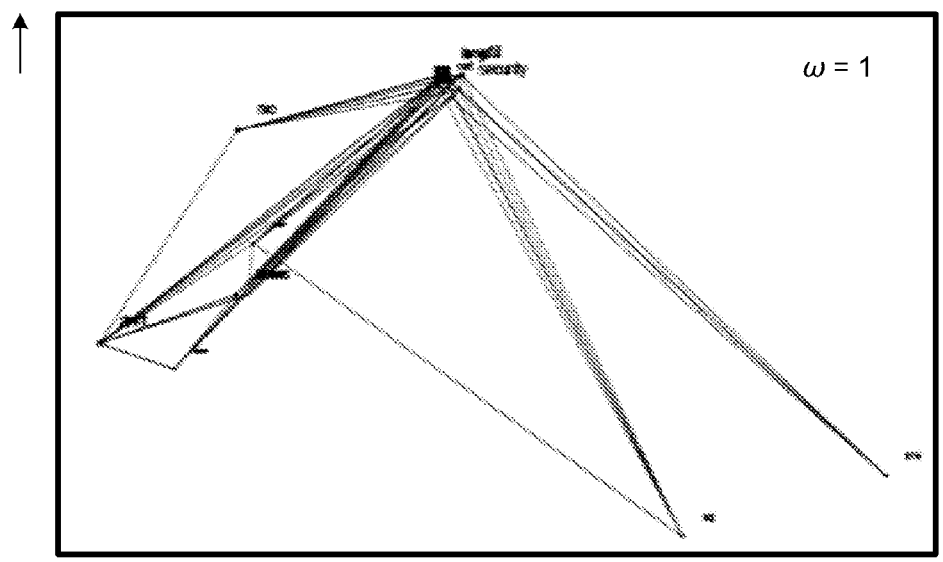

Finally, in FIG. 11, the biasing parameter ω is set to 1.0, which means that the visualization now shows only the dependencies among groups and none of the dependencies among individual components.

The use of the grouping information helps a user gain insight into the structure and operation of the software system, e.g., by clarifying the relationships among groups of components in the software system. The use of grouping information also helps to reduce the clutter in the visualization, again facilitating the explanatory power of the visualization.

A number of presentation-related mechanisms can be used to supplement the above-described visualizations. In one approach, the graph layout module 114 (of FIG. 1) can add labels to the visualizations to indicate the positions of the components within the graphs. In one case, to reduce clutter, the graph layout module 114 can present labels for only important components, e.g., corresponding to nodes that have at least a predetermined number dependencies associated therewith. The labels may correspond to symbols that indicate the locations of the corresponding components; alternatively, or in addition, the labels can provide text that describes the components. In one case, the graph layout module 114 can vary the size of the labels depending on the importance of the components associated with the labels. The graph layout module 114 can also apply labels to the groups. The graph layout module 114 can apply a label to a group corresponding to the barycenter of the components that are members of the group.

According to another mechanism, the graph layout module 114 can include visual cues to indicate the direction of dependencies in the visualization. For example, the graph layout module 114 can change the gradient of an edge from a first color (associated with the source of the dependency) to a second color (associated with the target of the dependency).

According to another mechanism, the graph layout module 114 can present visual cues to indicate edges which represent dependencies between components within the same group. For example, the graph layout module 114 can present darker edges to emphasize dependencies within groups.

According to another mechanism, the graph layout module 114 can present dynamic visualizations. For example, consider the case in which dependencies among components change over time. The graph layout module 114 can present a succession of visualizations which reveal the evolution of the system over time.

The graph layout module 114 can include yet additional display-related mechanisms.

D. Representative Processing Functionality

FIG. 12 sets forth illustrative electrical data processing functionality 1200 (simply "processing functionality" below) that can be used to implement any aspect of the functions described above. With reference to FIG. 1, for instance, the type of processing functionality 1200 shown in FIG. 12 can be used to implement any aspect of the system 100. In one case, the processing functionality 1200 may correspond to any type of computing device.

The processing functionality 1200 can include volatile and non-volatile memory, such as RAM 1202 and ROM 1204, as well as one or more processing devices 1206. The processing functionality 1200 also optionally includes various media devices 1208, such as a hard disk module, an optical disk module, and so forth. The processing functionality 1200 can perform various operations identified above when the processing device(s) 1206 executes instructions that are maintained by memory (e.g., RAM 1202, ROM 1204, or elsewhere). More generally, instructions and other information can be stored on any computer-readable medium 1210, including, but not limited to, static memory storage devices, magnetic storage devices, optical storage devices, and so on. The term "computer-readable medium also encompasses plural storage devices. The term computer-readable medium also encompasses signals transmitted from a first location to a second location, e.g., via wire, cable, wireless transmission, etc.

The processing functionality 1200 also includes an input/output module 1212 for receiving various inputs from a user (via input modules 1214), and for providing various outputs to the user (via output modules). (The input modules 1214 can be used to implement the user interaction module 106 of FIG. 1.) One particular output mechanism may include a presentation module 1216 and an associated graphical user interface (GUI) 1218. (The presentation module 1216 can be used to implement the presentation module 108 of FIG. 1.) The processing functionality 1200 can also include one or more network interfaces 1220 for exchanging data with other devices via one or more communication conduits 1222. For example, the network interface 1220 can allow a remote user to access the services of the graph processing module 104, which may be implemented by logic provided by the processing functionality 1200. One or more communication buses 1224 communicatively couple the above-described components together.

In closing, the description may have described various concepts in the context of illustrative challenges or problems. This manner of explication does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving graph information associated with a plurality of components;
   receiving grouping information that identifies groups within the plurality of components;
   generating group results based on analysis of the graph information and the grouping information;
   performing component-level analysis based on the graph information and the group results, the group results being used to bias the component-level analysis based on one or more biasing parameters, the component-level analysis producing layout results; and
   presenting a visualization of the layout results, the visualization representing the plurality of components,
   wherein the one or more biasing parameters affect positioning of the plurality of components in multiple dimensions of the visualization, and
   wherein at least the generating of the group results, the performing of the component-level analysis, and the presenting of the visualization are performed by one or more processing devices,
   wherein the generating of the group results and the performing of the component-level analysis together operate to assess similarity among individual components and importance of the individual components.

2. The method of claim 1, wherein the plurality of components correspond to software components in a software system.

3. The method of claim 2, wherein the graph information identifies the software components and relationships among the software components.

4. The method of claim 2, wherein each group identified by the grouping information corresponds to a collection of software components that share at least one characteristic.

5. The method of claim 1, wherein the generating of the group results comprises:
   coalescing first nodes representing the plurality of components in a component-level graph G based on the grouping information to form a group-level graph $G_g$ having second nodes representing the groups;
   determining distances $d_{ij}$ between the first nodes in the component-level graph G; and
   determining distances $dg_{ij}$ between the second nodes in the group-level graph $G_g$.

6. The method of claim 5, wherein the performing of the component-level analysis comprises:
   determining adjusted distances $\sigma_{ij}$ based on the distances $d_{ij}$ obtained from the component-level graph G and the distances $dg_{ij}$ obtained from the group-level graph $G_g$; and
   performing similarity analysis using the adjusted distances $\sigma_{ij}$.

7. The method of claim 6, wherein the similarity analysis is multidimensional scaling.

8. The method of claim 1, wherein the generating of the group results comprises:
   coalescing first nodes in a component-level graph G based on the grouping information to form a group-level graph $G_g$ having second nodes, wherein the first nodes represent the plurality of components and the second nodes represent the groups; and
   determining group importance values for individual second nodes within the group-level graph $G_g$.

9. The method of claim 8, wherein the performing of the component-level analysis comprises determining component importance values for individual first nodes within the component-level graph G using the group importance values computed for the group-level graph Gg as biasing influences.

10. The method of claim 9, wherein the importance values for the group-level graph $G_g$ and the component-level graph G are calculated using a network page ranking algorithm.

11. A hardware computer-readable memory device or non-volatile hardware computer-readable storage device storing computer-readable instructions, the computer-readable instructions providing a graph processing module when executed by one or more processing devices, the computer-readable instructions comprising:
    logic configured to perform similarity analysis to assess similarity among components, said logic configured to perform similarity analysis using grouping information to exert group-level influence on the similarity analysis;
    logic configured to perform importance analysis to assess relative importance of the components, said logic configured to perform importance analysis using the grouping information to exert group-level influence on the importance analysis; and
    logic configured to present a visualization of first results provided by the similarity analysis and second results provided by the importance analysis, a first dimension of the visualization being associated with the first results provided by the similarity analysis, a second dimension of the visualization being associated with the second results provided by the importance analysis, wherein positioning of the components in the first dimension of the visualization reflects the group-level influence exerted on the similarity analysis, and the positioning of the components in the second dimension of the visualization reflects the group-level influence exerted on the importance analysis.

12. The hardware computer-readable memory device or non-volatile hardware computer-readable storage device of claim 11, wherein the first dimension associated with the first results provided by the similarity analysis comprises a horizontal dimension of the visualization and the second dimension associated with the second results provided by the importance analysis comprises a vertical dimension of the visualization.

13. The hardware computer-readable memory device or non-volatile hardware computer-readable storage device of claim 11, wherein at least one biasing parameter $\omega$ controls an extent to which the grouping information influences the similarity analysis and the importance analysis.

14. A system comprising:
a graph processing module for visualizing relationships among components, the graph processing module comprising:
a similarity analysis module configured to assess similarity among the components, said similarity analysis module comprising:
logic configured to coalesce nodes in a component-level graph G based on grouping information to form a group-level graph $G_g$;
logic configured to determine distances $d_{ij}$ between the nodes in the component-level graph G;
logic configured to determine distances $dg_{ij}$ between nodes in the group-level graph $G_g$;
logic configured to determine adjusted distances $\sigma_{ij}$ based on the distances $d_{ij}$ obtained from the component-level graph G and the distances $dg_{ij}$ obtained from the group-level graph $G_g$; and
logic configured to perform similarity analysis using the adjusted distances $\sigma_{ij}$;
an importance analysis module configured to assess relative importance of the components, said importance analysis module comprising:
logic configured to generate importance values associated with the nodes within the group-level graph $G_g$; and
logic configured to perform importance analysis for components within the component-level graph G, as biased by the importance values generated for the nodes within the group-level graph $G_g$; and
a graph layout module configured to provide a visualization of results provided by the similarity analysis module and the importance analysis module; and
a computing device having a hardware processing device configured to execute the graph processing module.

15. The system of claim 14, wherein the similarity analysis performed by the similarity analysis module uses multidimensional scaling.

16. The system of claim 14, wherein the importance analysis performed by the importance analysis module uses a network page ranking algorithm.

17. The system of claim 14, wherein at least one biasing parameter $\omega$ controls an extent to which the grouping information influences the similarity analysis and the importance analysis.

18. The system of claim 17, wherein an adjustment to said at least one biasing parameter $\omega$ controls an affinity of components within a group to other members of the group, said affinity competing with group-agnostic dependencies among individual components.

* * * * *